United States Patent [19]

Sirefelt

[11] Patent Number: 4,593,811

[45] Date of Patent: Jun. 10, 1986

[54] DEVICE IN A ROTATING SHAFT SUPPORTING BEARING ELEMENT

[76] Inventor: Lars Sirefelt, Sisjövägen 321, S-436 00 Askim, Sweden

[21] Appl. No.: 631,551

[22] PCT Filed: Nov. 15, 1982

[86] PCT No.: PCT/SE82/00387

§ 371 Date: Jul. 12, 1984

§ 102(e) Date: Jul. 12, 1984

[87] PCT Pub. No.: WO84/01986

PCT Pub. Date: May 24, 1984

[51] Int. Cl.⁴ .............................................. B65G 39/10
[52] U.S. Cl. ...................................... 198/842; 198/499
[58] Field of Search ............... 198/842, 497, 499, 860, 198/861

[56] References Cited

U.S. PATENT DOCUMENTS 3,519,121  7/1970  Baldwin et al. ................ 198/842 X

FOREIGN PATENT DOCUMENTS

| 844880 | 7/1919 | Fed. Rep. of Germany | 198/499 |
| 1059348 | 6/1959 | Fed. Rep. of Germany | 198/842 |
| 2447868 | 4/1976 | Fed. Rep. of Germany | 198/842 |
| 0804555 | 2/1981 | U.S.S.R. | 198/497 |

*Primary Examiner*—Joseph E. Valenza
*Assistant Examiner*—D. Dayoan

[57] ABSTRACT

A device in bearing element (1) for a rotating shaft (2) in a machine, including a bearing housing (4) for each individual bearing element secured to a machine member (7) by a locking ring formed with a set of screw holes (13) through which pass a set of screws (12) in order to be secured to the bearing housing with the machine member sandwiched therebetween. The device comprises a retainer element (15) having an attachment plate (17) with a circular aperture and with a retainer (19) arranged on the attachment plate to fasten a member associated with the machine. A clamping ring (16) is formed with three screw holes (21) and a corresponding number of screws which may be passed through screw holes in the clamping ring and be secured to the bearing housing so as to extend through the aperture in the attachment plate and to be so positioned that the screws, through cooperation with the periphery of the aperture and jointly with the locking ring and the clamping ring, form a guide for the retainer element radially as well as axially. When the clamping ring is somewhat loosened, the retainer element may be turned and set in a chosen position of rotation relative to the rotating shaft, and when the clamping ring is tightened by the associated screws, the retainer element is fastened in the chosen position.

7 Claims, 7 Drawing Figures

4,593,811

DEVICE IN A ROTATING SHAFT SUPPORTING BEARING ELEMENT

TECHNICAL FIELD

The subject invention relates to a device in a bearing element devised to support a rotating shaft incorporated in a machine or the like, wherein the bearing housing of each individual bearing element is fastened to a machine member by means of a locking ring formed with a first set of screw holes through which pass a first set of screws, to be anchored to the bearing housing with the machine member sandwiched therebetween.

BACKGROUND

In many machines of various kinds comprising bearing elements to support rotating shafts there is often a need for an attachment means by means of which additional members associated with the machine may be fastened thereto. As examples of such machines may be mentioned conveyors which are provided with bearing elements e.g. at their ends, at which points are additionally required attachment means to secure support legs, scrapers, stripper plates, coupling elements to connect following conveyors, and so on. For this purpose separate attachment points have hitherto been drilled or otherwise provided in the machine frame or side boards, which requires both considerable work and space.

TECHNICAL PROBLEM

The purpose of the subject invention is to eliminate the drawbacks outlined above.

SOLUTION

This purpose is achieved by means of a device in accordance with the subject invention, which is characterized therein that the device comprises at least one retainer element consisting of an attachment plate formed with a substantially circular aperture therein and of a retainer means secured to the attachment plate to fasten a member associated with the machine, and also a clamping ring formed with at least three screw holes and a corresponding number of screws forming a second set of screws, said locking ring formed with a second set of screw holes through which said second set of screws may pass and be secured in the bearing housing, said second set of screws being arranged to extend through the aperture in the attachment plate and being so positioned that said screws, while cooperating with the periphery of said aperture and in conjunction with the locking ring and the clamping ring, serve to guide the retainer element radially as well as axially, said retainer element arranged, when the clamping ring is somewhat loosened, to be turned and set in a selected rotational position relative to the rotating shaft and, when the clamping ring is tightened, to be secured in the selected position by tightening said second set of screws.

BRIEF DESCRIPTION OF THE DRAWINGS

The invention will be described in closer detail in the following with reference to the accompanying drawings, wherein.

BEST MODE OF CARRYING OUT THE INVENTION

Figure 1:
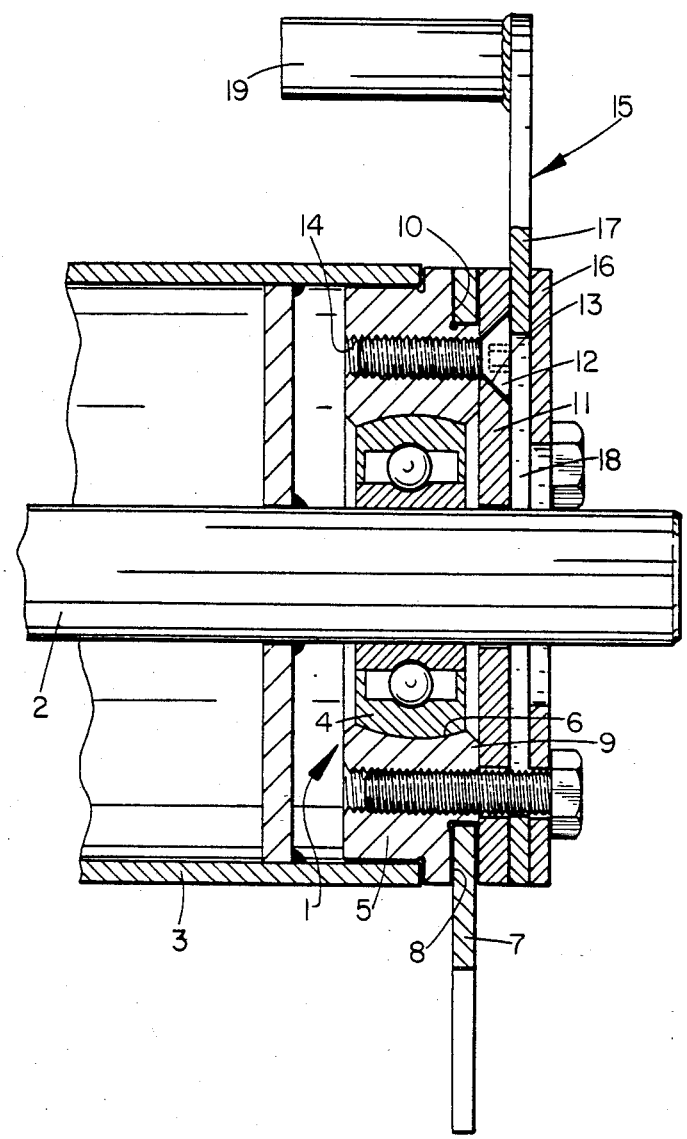
FIG. 1 is a partly broken vertical longitudinal sectional view through a conveyor roller comprising a bearing element equipped with a device in accordance with the invention provided with a retainer element of a first type.

As appears from FIG. 1, the subject invention uses a bearing element 1 supporting a rotating shaft 2 as the attachment means to fasten one or several different members forming part of a machine or the like, the latter being in the example illustrated a belt conveyor in which a conveyor roller 3 is rotatably mounted in the bearing element 1 by means of a roller bearing 4 which is mounted in a bearing housing 5. The bearing housing 5 is essentially annular and is formed with a central cavity 6 in which the roller bearing 4 is positioned. The rotating shaft 2 on which the conveyor roller 3 is fixedly secured thus is rotatably mounted in the roller bearing 4 and projects laterally beyond the two end walls 7 of the conveyor, as is common standard practice, in order to allow it to be connected to a prime mover via transmission means at a suitably chosen side of the conveyor. At the side where the transmission means are not connected a protective hood of e.g. plastics usually is applied, this hood being not, however, shown in the drawings. The bearing housing 5 has a annular recess 8 allowing a raised portion 9 of the bearing housing to project into a circular recess 10 formed in the side wall 7 of the conveyor, this wall being in the form of a sheet metal plate or the like. Cooperation between the surfaces of the sheet metal plate and the edge faces of the recess 8 provides for guidance and position-control of the bearing housing relative to the recess, ensuring that the rotating shaft 2 extends substantially through the centre of the recess 10 or opening.

Figure 3:
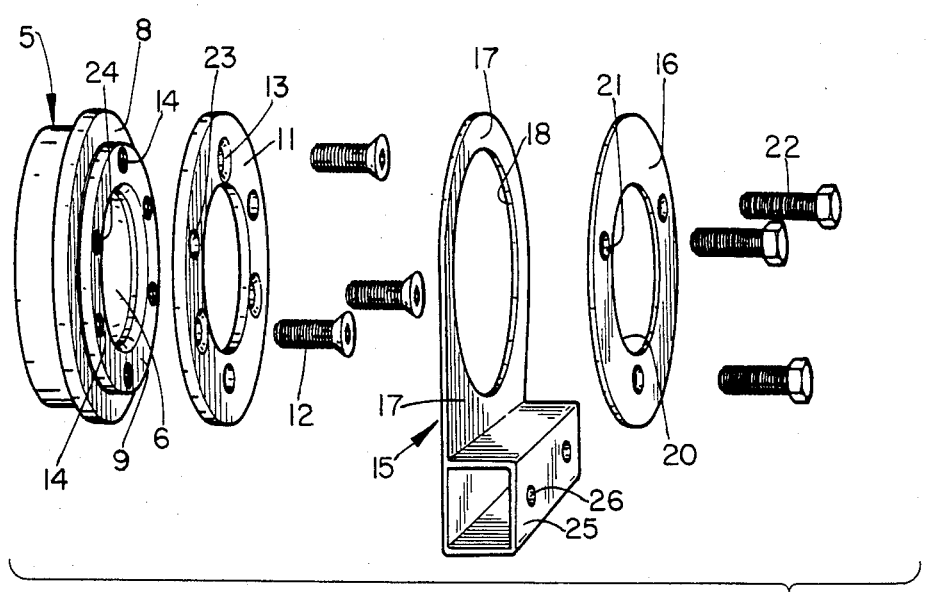
FIG. 3 is an exploded view of the device in accordance with the invention comprising a retainer element of said second type.

The bearing element 1 and thus also the rotating shaft 2 and the conveyor roller 3 are maintained in their supported position by the lateral wall 7 because the bearing housing 9 is secured in position in the recess 10 by means of a locking ring 11, see also FIG. 3. The latter is retained in position by means of a number of screws 12, three in accordance with the example shown. The screws pass through corresponding holes 13 which are countersunk in the locking ring in order to accommodate the countersunk heads of the screws and which are positioned symmetrically at even-pitch spacings along the periphery of the locking ring. In the assembled position of the device the screws 12 are screwed into correspondingly positioned threaded bores 14 formed in the bearing housing. Because the annular recessed portion 8 of the bearing housing has a depth which does not exceed the thickness of the lateral wall 7 a positive fastening effect is obtained.

The device in accordance with the invention consists of a retainer element 15 which is intended to be secured to the bearing element in accordance with the invention by means of a clamping ring 16. The retainer element 15 comprises an attachment plate 17 in which is formed a circular aperture 18, and a retainer means 19 which could be of different types, depending on the application. The purpose of the retainer means 19 of the retainer element 15 is to support and fasten various members and details incorporated in or associated with the machine. One example thereof will be described in closer detail in the following with reference to FIGS. 6 and 7.

As best illustrated in FIGS. 1 and 3 the clamping ring 16 likewise is formed with an aperture 20 the diameter size of which is not particularly decisive but which is intended to provide space for the projecting rotating shaft 2 and its associated protective hood and possibly able to serve to fasten the latter by clamping a flange on the hood. The clamping ring 16 further is formed with a number of holes 21, three in accordance with the example illustrated, which holes are positioned symmetrically at even pitch along the periphery of the ring and are designed to receive screws 22 therein. As appears from FIG. 3 also the locking ring 11 and the bearing housing 5 are formed with a second set of holes 23, 24 for this second set of screws 22. The second set of holes 23, 24 in the locking ring and the bearing housing are angularly displaced relative to the first set of bores 14, for instance in such a manner that they will be positioned symmetrically between the first set of holes and bores.

Figure 2:
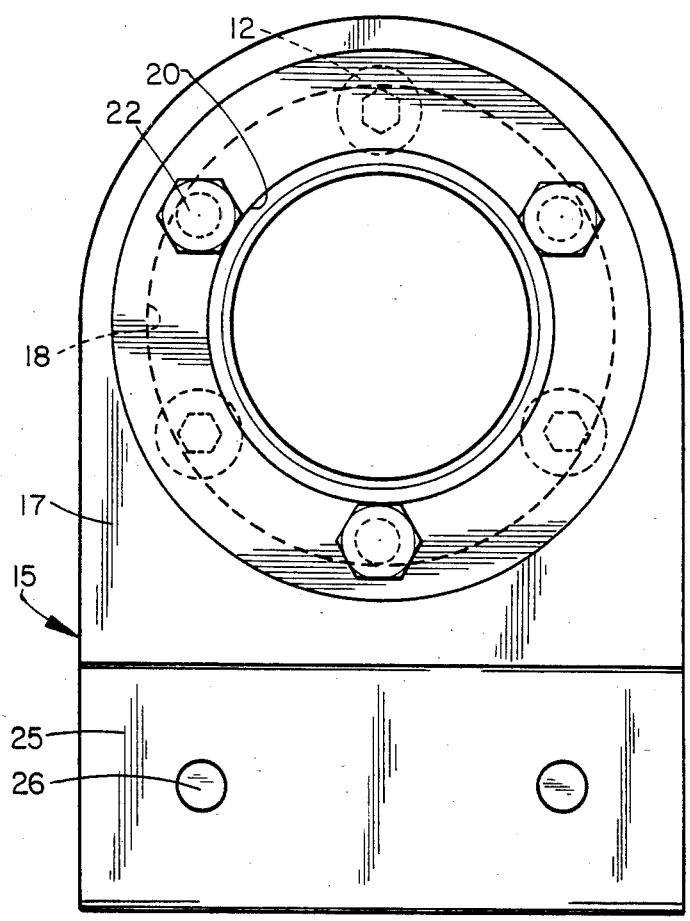
FIG. 2 is a lateral view of the device in accordance with the invention, equipped with a retainer element of a second type.

As appears from FIGS. 1, 2 and 3 the second set of screws 22 extends through the circular aperture 18 formed in the retainer element 15 and thus serves to tighten the clamping ring 16 against the attachment plate 17 of the retainer element and thus to fasten the latter when they are screwed into the second set of bores 24 formed in the bearing housing 9.

In accordance with the invention the screws 22 fastening the clamping ring 16 are spaced equal radial distances from the centre of the ring, this radial distance being so chosen relative to the aperture 18 formed in the attachment plate 17 of the retainer element 15 that the screws will form a guiding means to guide the retainer element 15 radially, as best appears from FIG. 2, ensuring that the latter element is positioned centrally with its aperture 18 essentially coaxial with the symmetry axis of the bearing element, that is, with the rotating shaft 2, whereas the locking ring 11 and the clamping ring 16 on either side of the attachment plate will form guiding means for guidence axially. When the screws 22 are slightly loosened, that is when they are unscrewed somewhat over a few turns from their fully screwed-in position, the screws together with the clamping ring 16 will form supports on which the retainer element 15 rests while being allowed to be turned relative to the bearing housing 9 to any desired rotational position as a result of the above-referred to cooperation between the periphery of the aperture 18 and the external faces of the screws 22. When the element is set in the desired position, the screws 22 are tightened and the retainer element 15 is maintained securely in position.

Figure 4:
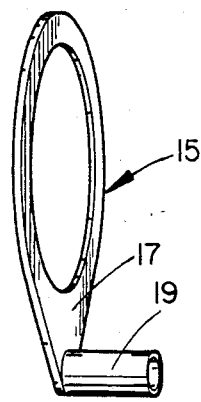
FIG. 4 is a perspective view of the retainer element of the first type.
Figure 6:
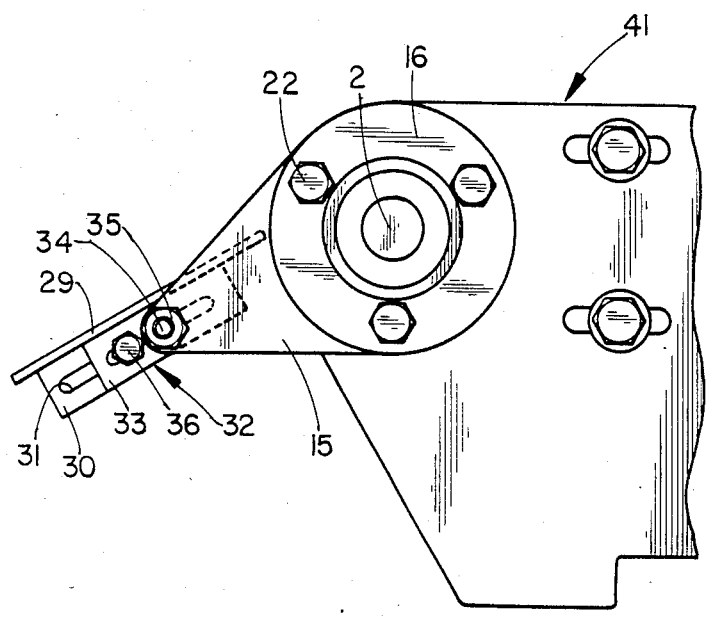
FIG. 6 is a partly broken lateral view of a conveyor equipped with the device in accordance with the invention and FIG. 7 is a partly broken view from below of the conveyor in accordance with FIG. 6.
Figure 7:
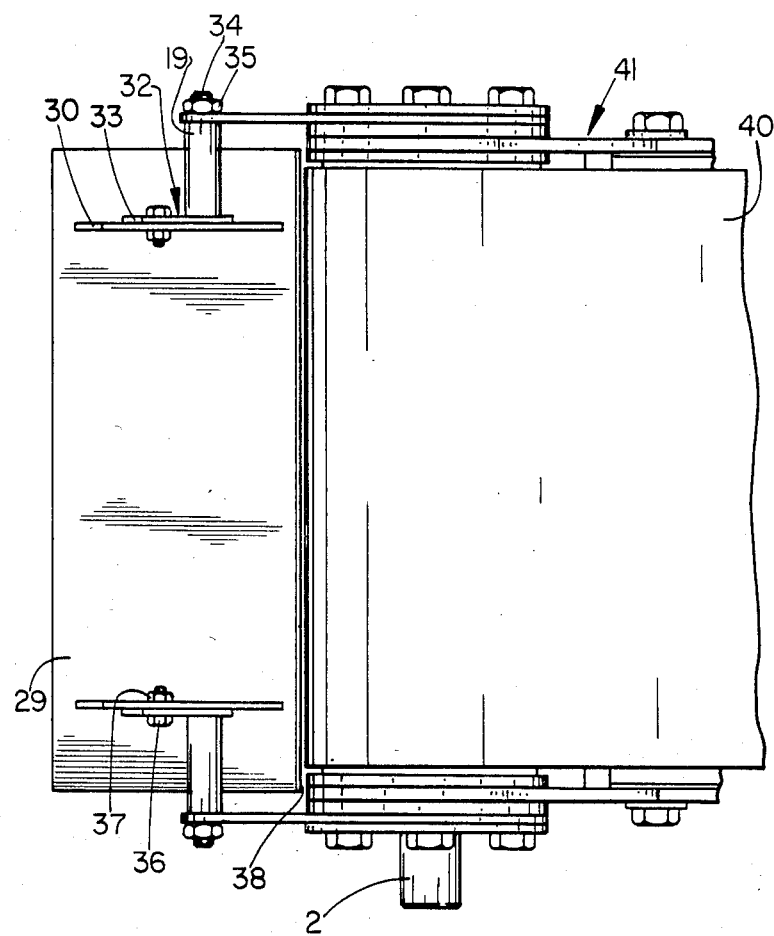

FIG. 4 illustrates in a perspective view a retainer element 15 of the same type as the one shown in FIG. 1 but being formed with a retainer means 19 which is in the form of a tubular piece projecting laterally from the attachment plate 17. The tubular piece is hollow and open at both ends and extends through the attachment plate 17. This type of retainer element may be used for a variety of purposes and applications and one example of usage is shown in FIGS. 6 and 7 as will be described in closer detail in the following. The retainer means 19 in accordance with FIG. 4 could also be used as a holder means to support the mounting shaft of a supplementary conveyor roller or the like.

A second type of retainer element is shown in the exploded view of FIG. 3, wherein the retainer element retainer means is designated by numeral 25. This retainer means is in the form of a piece of box-shaped profile member having two screw holes 26 formed therein. This type of retainer element may be used to secure support legs or similar details on which the conveyor is supported. When the retainer means is disposed horisontally as illustrated in FIG. 3, the support leg may be in the form of a horizontal bracket member which is anchored in a neighbouring wall of the premises. The device in accordance with the subject invention thus makes it possible to set the retainer means 25 in any desired rotational position relative to the rotating shaft 2 and then be fastened in this position.

Figure 5:
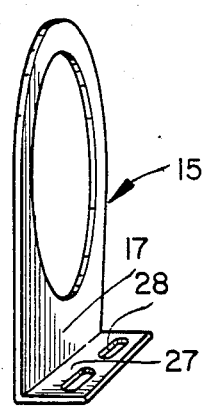
FIG. 5 is a perspective view of a retainer element of a third type.

FIG. 5 shows an example of yet another type of retainer element 15 comprising a retainer means 27 in the form of an angle iron in which are formed elongate slots 28. This type of retainer element allows any required detail to be fastened by screws in the desired angular position relative to the rotating shaft.

FIGS. 6 and 7 show an example of a member designed to be fastened to the bearing element by means of the retainer element 15 of the invention. In this case, the supported member is a transfer plate 29 which is disposed at one end of a belt conveyor 40 in order e.g. to allow objects advanced on the conveyor to be transferred from or to the conveyor belt 40 to ensure that they are not entrained on the belt return path but are transported further to a collection point or to the following conveyor. The transfer plate 29 is formed on its lower face with two fixed attachment irons 30 each one of which is formed with an elongate slot 31. The retainer element of this example is, as mentioned previously, of the first type shown in FIGS. 1 and 4 and is connected with a connecting member 32. The latter is in the form of an attachment iron 33 and a threaded pin 34 which is secured to one end of the iron and extends through the retainer means 19 and supports a nut 35 at one of its ends. The two attachment irons 30 of the transfer plate 29 are joined to the connecting members 32 by means of a screw 36 and a nut 37.

Owing to the arrangement just described the transfer plate 29 may be set in any desired position relative to the belt of the conveyor and the rotating shaft 2. For instance the vertical position of the transfer plate, that is, the position of the retainer means 19, may be set in accordance with the invention by rotating the retainer element about the rotating shaft 2 after the tightening screws 22 have been loosened, said screws being again tightened as soon as the chosen position is set. Further angular positions of the transfer plate 29 are possible by pivoting the plate about the retainer means, the nut 35 having been loosened. Adjustment of the trailing end 38 of the transfer plate relative to the conveyor belt 40 is possible by displacement of the attachment irons 30, 33 relative to one another after loosening of the screw 36 and the nut 37.

The invention is not limited to the embodiment described in the aforegoing and illustrated in the drawings but a number of variations are possible within the scope of the appended claims. For instance, the number of screws and their positions could be chosen differently. Further, the retaining element could have a different configuration and be equipped with other retainer means than those shown, depending on the intended application. It is likewise possible in one and the same bearing element to mount more than one retainer element, for instance two such elements, with the aid of one and the same clamping ring. Although in the aforegoing has been described a bearing element disposed at one end of a conveyor roller it goes without saying that in a number of applications the bearing element at the opposite end of the conveyor roller may be equipped with an identical device, as appears from FIGS. 6 and 7. In some applications it is, however, conceivable to arrange one type of retainer element at one side of the conveyor only whereas the opposite side has no such retainer element at all or else is formed with another type of retainer element in order to support other machine members or accessories. Similarly, the feed-in end of the conveyor and the discharge end thereof may be arranged differently. The theoretical ideal condition is shown for illustrative purposes in FIG. 2, more precisely the case when the edge 20 of the aperture 18 is tangent to the outer faces of all three screws 22, which provides for perfect guiding control radially. However, for practical reasons some play must be tolerated, and in practice therefore the tangential support is effected against one or two screws at a time.

I claim:

1. For use in a machine member of a machine having a rotatable shaft, a bearing element with a bearing housing, and a locking ring having a first set of screw holes through which pass a first set of screws to be anchored to the bearing element with the machine member sandwiched therebetween, a device for attaching an element to said machine, said device comprising: at least one retainer element having an attachment plate formed with a substantially circular aperture therein, and retainer means secured to the attachment plate to fasten a member associated with the machine, and a clamping ring formed with at least three screw holes and a corresponding number of screws forming a second set of screws, said locking ring having a second set of screw holes through which said second set of screws may pass and be secured in the bearing housing, said second set of screws being arranged to extend through the aperture in the attachment plate and being so positioned that said screws of said second set, while cooperating with the periphery of said aperture and with the locking ring and the clamping ring, guide the retainer element radially as well as axially, said retainer element when the clamping ring is somewhat loosened, being adapted to be turned and set in a selected rotational position relative to the rotating shaft and, when the clamping ring is tightened, to be secured in the selected position by tightening of said second set of screws.

2. A device as claimed in claim 1, comprising: a plurality of different retainer elements for mounting to the bearing element and to be fastened by said clamping ring.

3. A device as claimed in claim 1, comprising a retainer element with a retainer means in the form of a tubular piece having a cavity therein extending through the attachment plate.

4. A device as claimed in claim 1, comprising a retainer element with a retainer means in the form of a piece of a box-shaped profile member.

5. A device according to claim 1, comprising a retainer element with a retainer means in the form of an angle iron having attachment holes formed therein.

6. A device as claimed in claim 1, wherein the machine is a belt conveyor and the machine member is a plaste positioned adjacent a conveyor belt of the conveyor and is adjustable relative to the latter, said plates having a lower face with two attachment irons hingedly interconnected with said retainer means at either end of a conveyor roller positioned at an end of the conveyor, said plate being adapted to be set via a pin extending through said retainer means in different angular positions relative to the retainer element.

7. A device as claimed in claim 6, wherein said plate is adjustable to positions at various distances from the conveyor roller by said attachment irons of said plate being displaceable crosswise relative to a longitudinal direction of said retainer means.

* * * * *